July 10, 1956 H. S. ALLISON 2,753,903
FRUIT JUICING MACHINE WITH RIND EJECTOR
Filed Feb. 28, 1951 2 Sheets-Sheet 1
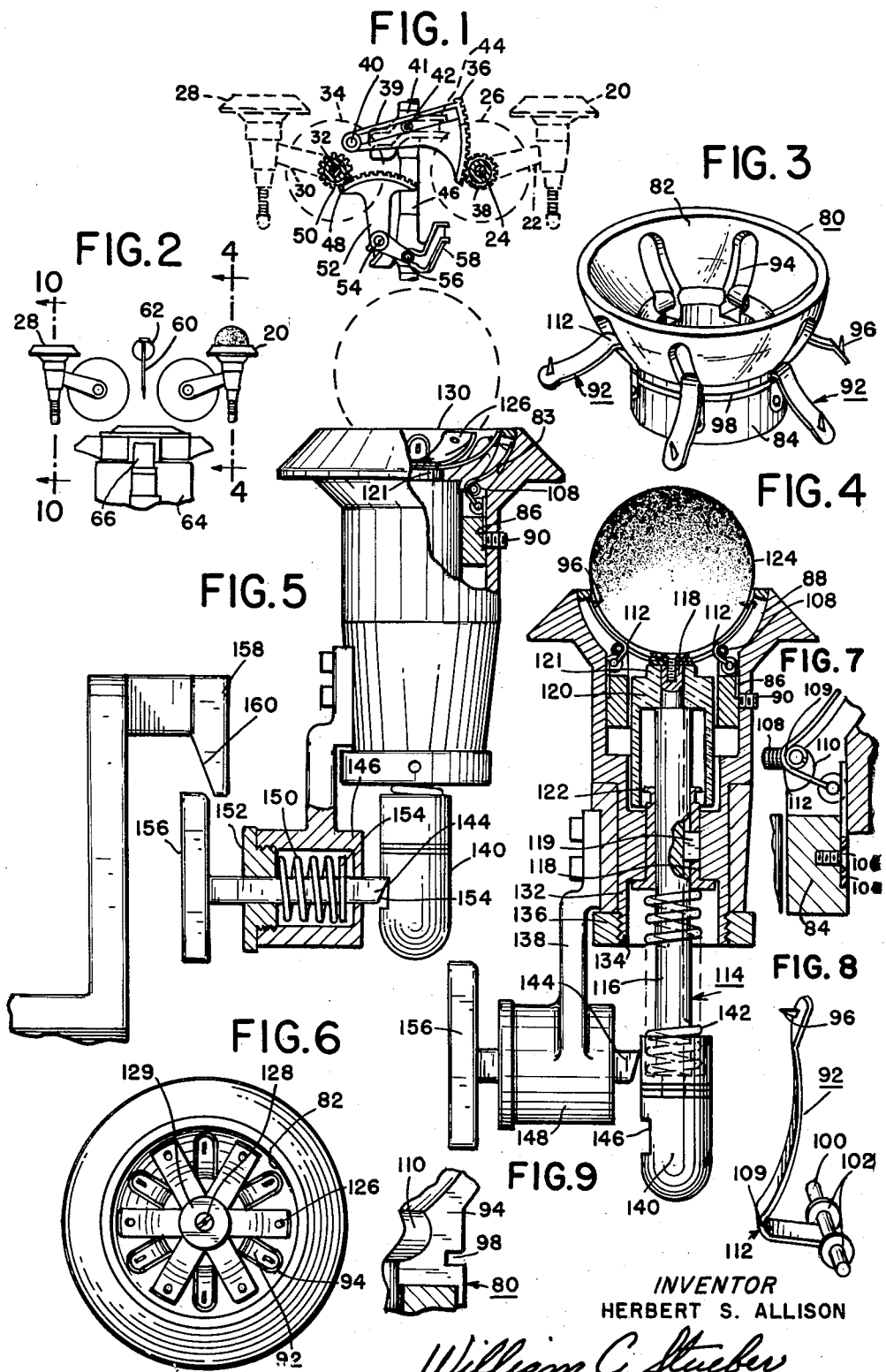
INVENTOR
HERBERT S. ALLISON
BY William C. Stueber
ATTORNEY July 10, 1956        H. S. ALLISON        2,753,903
FRUIT JUICING MACHINE WITH RIND EJECTOR
Filed Feb. 28, 1951        2 Sheets-Sheet 2
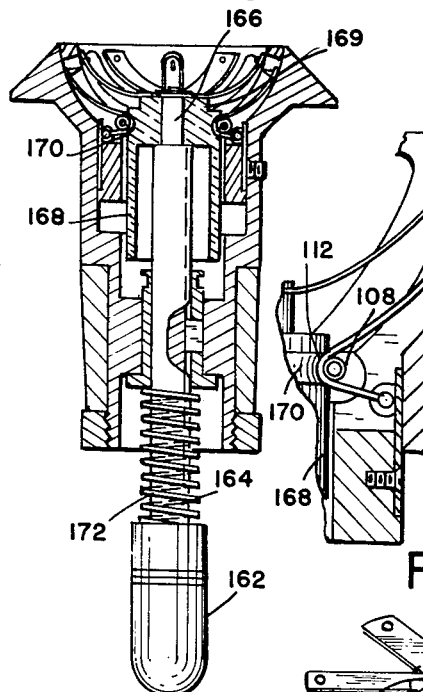
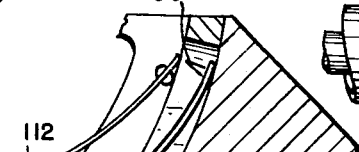
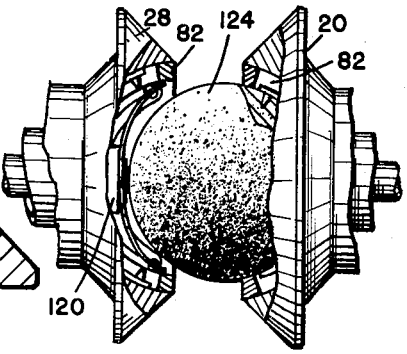
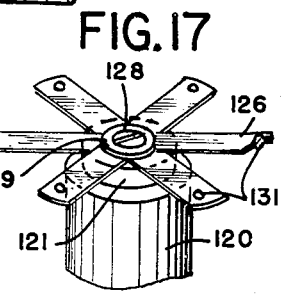
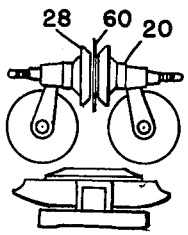
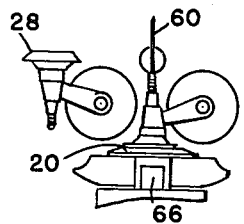
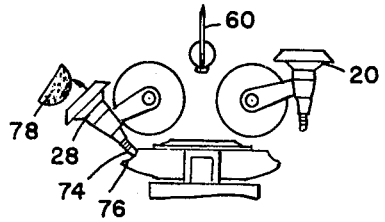
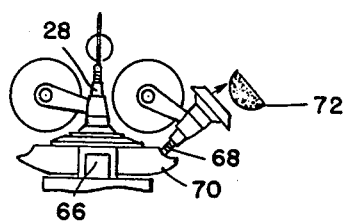
INVENTOR
HERBERT S. ALLISON
BY William C. Strueber
ATTORNEY United States Patent Office 2,753,903
Patented July 10, 1956

2,753,903

FRUIT JUICING MACHINE WITH RIND EJECTOR

Herbert S. Allison, Minneapolis, Minn., assignor to General Mills, Inc., a corporation of Delaware Application February 28, 1951, Serial No. 213,187

9 Claims. (Cl. 146—3)

The present invention relates to improvements in automatic fruit-juicing machines and more specifically to improvements in devices for holding the fruit while it is being cut and while the juice is being extracted and later expelling the extracted rind.

The mechanism illustrated in the present application, embodying the preferred form of applicant's invention, is preferably used in connection with an automatic fruit-juicing machine, such as the type shown in Patent No. 2,365,832, issued to Charles Z. Monroe.

Automatic machines of this general type are used for extracting the juice from fruit, such as oranges and other citrus fruit. It has been proposed that these machines be used as automatic coin vending machines, similarly to the automatic soft drink vending machines which are now commonly found in public places. The public will use these machines by inserting a coin into a slot, whereupon the machine automatically extracts the juice from the fruit and delivers to the customer a measured quantity of fresh juice. The machines may be so constructed so as to give the added attraction of permitting the customer to observe the complete treatment of the citrus fruit from its being severed in half to its being juiced and the extracted fruit rind expelled. In this instance, it becomes even more important to provide reliable devices for handling the fruit which will not let the fruit drop during the extracting cycle.

The present fruit handling devices may be used, however, in any machine which has as its function the extraction of juice. In a machine of that general nature, the fruit is usually automatically fed from the hopper bin to a hand which securely holds the fruit in position while a knife severs it in half, the other half being held by a similar hand. The hands then carry the fruit down to an extractor member which may be in the form of a rotating reamer to remove the juice from the interior of each of the halves of fruit. The juice is delivered to a collecting container or to a cup which is subsequently delivered to the consumer. The devices which hold the fruit then discard the rind and move up to receive a fresh unextracted fruit to again repeat their cycle. The present invention concerns itself only with improvements in devices for receiving and handling the fruit while it is receiving the necessary treatment requisite to extracting the juice.

Accordingly, an object of the present invention is to provide a pair of fruit-handling hands which will positively and securely grasp the fruit to permit it to be severed into two sections and which will carry the sections to the juice extractor without dropping or damaging the fruit and giving full cooperation to the performance of the cutting and extracting members.

Another object of the invention is to provide a fruit-handling hand which will hold a half fruit while it is being reamed and which will completely expel the extracted rind from the hand without leaving any sections of the rind in the cup, no matter how unevenely the rind is extracted or how distorted or torn the rind becomes during extraction.

A further object of the invention is to provide a simple and economical fruit-handling mechanism which will reliably and rapidly handle a great number of fruits without requiring the attention of an operator and without danger of jamming the machine due to allowing the fruit to slip and drop into the working parts of the machine.

Other objects and advantages will become apparent in the following specification taken in connection with the drawings in which Figure 1 is a front elevation illustrating the arrangement of the mechanism for operating the fruit-carrying hands;

Fig. 2 is a schematic view, taken in front elevation, illustrating the position of the hands as the fruit is received;

Fig. 3 is a perspective view in detail showing the cup for supporting the gripper fingers which is carried inside the hand;

Fig. 4 is an enlarged sectional view taken along line 4—4 of Fig. 2;

Fig. 5 is a side elevation of the fruit-receiving hand having portions broken away to illustrate details of the mechanism;

Fig. 6 is a plan view of the top of the fruit-carrying hand;

Fig. 7 is a fragmentary view taken in section illustrating the mounting of the gripping fingers;

Fig. 8 is a perspective view of a fruit-gripping finger;

Fig. 9 is an enlarged fragmentary view taken in section of the liner for the fruit cup which is shown completely in Fig. 3;

Fig. 10 is an enlarged sectional view taken along line 10—10 of Fig. 2;

Fig. 11 is an enlarged fragmentary view of a portion of Fig. 10 showing the relative positions of the expeller leaves and gripper fingers;

Fig. 12 is a front elevation having portions broken away to show in detail the position of the fruit as the fruit-carrying cups approach each other;

Fig. 13 is a schematic view in front elevation showing the position of the cups as the knife severs the fruit;

Fig. 14 is a schematic view in front elevation illustrating the position of the cups as one section of the fruit is being reamed;

Fig. 15 is a schematic view in front elevation illustrating the remaining fruit section of Fig. 14 being reamed and the extracted fruit rind being ejected;

Fig. 16 is a schematic view taken in front elevation showing the rind extracted in Fig. 15 being expelled and the remaining cup returned to fruit-receiving position; and Fig. 17 is a perspective in detail of the rind expelling web.

The mechanism embodying the preferred form of the present invention includes a pair of fruit-holding hands which are carried through a series of successive positions to present the fruit at appropriate locations for the operations which accomplish the extraction of the juice from the fruit. An important phase of the operation of these cups is that they at all times grip the fruit firmly and securely, obviating any danger of the fruit being accidentally spilled or dropped, with the undesirable consequences that the fruit may jam the other working mechanism or drop into places where it may remain unnoticed to decay with the apparent undesirable effects. The intricate gripping mechanism contained within the fruit-carrying cup will be explained later and a general description of the over-all functions of the fruit-carrying cups will be first discussed.

Referring to Fig. 1, the fruit-receiving hand 20, which first receives the fruit, is shown on the right carried on an arm 22 mounted on a pivotal shaft 24. Also carried on the shaft is a disk 26 which may be weighted on one side to counterbalance the weight of the hand. The second hand 28, which receives the fruit from the first hand, is shown on the left in Fig. 1 and is similar to the first hand from outward appearances, being carried on a similar arm 30 mounted on a shaft 32. The shaft carries a disk 34 which may be counterweighted. To give rotatable movement to the shaft 24 and pivot the first hand 20 through its path, a segment gear 36 meshes with a pinion gear 38 mounted on the shaft. The segment gear is carried at the outer end of the arm 39 pivoted on the frame of the machine at 40. The framework is not shown in detail as it may be of any suitable nature and normally is part of the main juicer machine as shown in the aforementioned Monroe patent. The arm is given pivotal movement by means of a follower 42 secured to a mid-point of the arm and riding in a cam 44 which is carried on a rotatable vertical cam shaft 46 rotated in timed sequence to the remainder of the juice extracting machine.

To rotate the second hand 28 about its shaft 32, a second segment gear 48 meshes with a pinion gear 50 mounted on shaft 32. This segment gear is carried on a pivotal arm 52 pivotally mounted on the frame at 54 and carrying a follower 56 which rides in the track of cam 58 also carried on the vertical cam shaft 46. This operating mechanism rotates the hands about their supporting shafts to position them for their fruit-handling function in a manner which will now be described.

Referring now to Fig. 2, the hands 20 and 28 are shown in their neutral position. The orange is received by the first hand 20, being placed manually or being dropped by automatic fruit-feeding mechanism. Positioned between the two hands is the fruit-slicing knife 60 supported on its actuating carrier 62. Positioned below and intermediate the two hands is the fruit reaming assembly 64 having a central reamer 66 which is rotatable by a suitable mechanism not shown.

After the orange has been received by the hand 20 the cups are swung up to the position shown in Fig. 13. As the first hand 20 begins its movement toward the second hand 28, the orange is firmly gripped therein by mechanism which will later be described in detail. The fruit is carried into the second hand and forced therein whereupon mechanism within the second hand firmly grips the half of the fruit which is within the hand. At that position operating mechanism, which is timed with respect to the cup rotating cam shaft 46, swings the knife blade 60 between the two hands severing the fruit into two half sections.

The second hand 28 then backs off (Fig. 14) carrying its half section of fruit, rotating counterclockwise to get out of the way of the first hand carrying its half section of fruit and permit it to rotate counterclockwise to reaming position and carry the fruit down against the reamer 66 whereupon the reamer, being suitably rotated, extracts the juice from the fruit section. Suitable channels are provided to carry away the reamed juice and route it to the filling and straining mechanism where it is deposited in a container or delivered to a consumer's cup. This juice delivering mechanism forms no part of the present invention and the fruit-handling devices herein shown may be used in any suitable type of juicing mechanism which requires that the fruit be handled and delivered to it in the manner shown.

After the juice is extracted from the section of fruit carried in the first hand 20, the hand is rotated clockwise to carry the extracted rind to an ejecting position, as is shown in Fig. 15. Upon reaching the extreme position of rotation shown in that figure, the extractor plunger 68 strikes a jutting projection 70 on the reamer assembly, which causes the mechanism within the hand to function to expel the fruit rind 72 from the cup. The rind drops to a waste-collecting bin, not shown, positioned below. The second hand 28 in the meanwhile is rotated clockwise to reaming position to carry its half section of fruit against the reamer 66 and have the juice extracted from that section of the fruit. After this half section of fruit has been held against the reamer for a sufficient time for the juice to have been reamed therefrom, the hand is pivoted counterclockwise to the rind ejecting position shown in Fig. 16 where the ejecting plunger 74 strikes a jutting projection 76 on the reamer assembly to cause expulsion of the fruit rind 78. The first hand 20 has meanwhile been pivoted counterclockwise from the ejecting or expelling position back to the normal fruit-receiving position where it is halted in preparation for the receipt of a fresh unextracted fruit. The second fruit hand 28 is, after the fruit has been expelled, pivoted back to its normal position where it is positioned at the time the first hand receives the fruit, as was shown in Fig. 2.

During the time both hands are free of the path of the knife, it is returned to its normal position of Fig. 2 where it is again ready to perform its function of cutting through the center of the fruit which is held between the two hands in the manner previously described in connection with Fig. 13.

It will readily be understood, in connection with the previous description of the function of the fruit-carrying hands, that if the hands grip the fruit insecurely at any time during the cycle, the whole fruit or a severed half section of the fruit might slip from the hands to drop into the operating mechanism and jam the machine. At best, the half section of the fruit would not be properly juiced and might fall in a position where it would remain undetached in cleaning the machine and decay. If the machine is of the type in which the operation is observed by the customer, this dropping of the fruit would be even more undesirable. I have therefore attempted to obviate the possibilities of accidentally dropping the fruit by providing a new and improved gripping mechanism operating at a certain time in the cycle of operation which will function to positively grip the fruit giving it no opportunity to slip from the hands during any portion of the operation.

Referring now to the details of the fruit-gripping mechanism, Fig. 3 illustrates a cup-shaped liner 80 which is secured within each of the fruit-carrying hands. The liner is preferably a casting which has an inner rounded cup-shaped upper portion 82 of the size and shape of the orange to be gripped. For purposes of securing the orange receiving cup in the receiving socket 83 of the hand a cylindrical extension 84 on the lower portion extends into a receiving bore 86 which is below the receiving socket 83 of the hand. This relationship is shown in detail in Figs. 4, 5 and 10. The cup element and supporting hand structure of the two hands are the same. The set screw 90 in the side wall of the hand locks the cup in place.

With each set of hands a number of sets of cups may be provided, each set being of a different size to accommodate different grades of fruits. The size of fruit, such as oranges, is generally given a grade number when placed upon the market and with a certain set of cups, oranges of only a given grade should be used. If the grade is to be changed, the cups may be easily replaced by a set of a size to accommodate the new grade to be used.

Orange gripping fingers 92 (shown in detail in Figs. 3 and 8) are spacedly positioned around the circumference of the cup and slots 94 are milled into the side of the cup to permit passage of the fingers through the cup side. Sharp pointed prongs 96 are fixed to the interior face of each finger to bite into the side of the fruit and hold it firmly within the cup. These fingers are pivotally mounted at their lower ends in the cylindrical extension or base 84 of the cup. At the upper portion of the cylindrical extension of the cup is an annular groove 98 extending circumferentially around the extension. This portion of the cup is shown in large detail in Fig. 9. The fruit gripping fingers have at their lower end trunnion pins 100 which are journaled in the annular groove 98. The trunnion pins carry collars 102 and a keeper 104, secured to the wall of the cup base 84 by a screw 106, is held between the collars against the trunnion pin to hold the finger in its pivotal mounting on the cup. The fingers are urged inwardly by an annular coil spring 108 which rests in the crotch 109 formed by the bend at the base of the fingers. An annular groove 110 is cut at the base of the inner surface of the cup to accommodate the spring when the fingers are spread outwardly. This structure is shown in detail in Fig. 7. This bend 109 at the base of the fingers provides the crotch to accommodate the spring 108 and provides an outer shoulder 112 at the base of the finger against which outward pressure may be applied to spread the fingers away from the fruit.

Referring to Fig. 4, mounted for sliding movement inside the hand is an ejector assembly 114. The assembly comprises a main stem 116 which is slidably journaled inside of a sleeve 118 secured within the central bore of the hand and a key 119 prevents rotation of the stem. The upper end of the stem 116 has a reduced portion 118 over which is slid a hollow plunger or ejector cam 120. This member is preferably formed of plastic or other material not affected by acid fruit juices. A sealing gasket 122 is positioned between the stem 116 and ejector member 120 to prevent juices from working up into the hollow portion of the member. As the stem 116 of the ejector slides to ejecting position in the hand to the position shown in Fig. 5, the sides of the ejector cam or plunger 120 engage the shoulders 112 of the gripping fingers to force the fingers outwardly away from the fruit, as shown in Fig. 5. The ejector cam 120 has an upper reduced portion 121 providing a space into which the shoulders 112 of the gripper fingers may drop when the plunger is fully retracted. As the stem slides downwardly to move the ejector member to retracted position, the fingers under the urging of the coil spring 108 are permitted to snap against the fruit and the sharp points 96 will bite into the skin to securely hold the fruit within the cup. This position of the ejector member and fingers is shown in detail in Fig. 4.

It will be noticed that as the ejector plunger moves upwardly through the hand, it enters the semi-cylindrical area of the cup to force the fruit from the cup. In some instances the reamer which extracts the juice from the fruit may tear, distort or otherwise deform the rind, making it difficult to remove the rind from the cup by mere pressing against the lower center portion of the fruit. In order to be certain that the entire rind is removed, I have provided a unique resilient web-shaped scraper within the cup.

This cup cleaning scraper is formed of a plurality of thin resilient leaves 126 secured at their midpoint, as shown in detail in Fig. 17. The leaves 126 normally lie within a flat plane and are attached to the top of the ejector member 120 by means of a bolt 128 which holds a washer 129 over the top of the leaves and which passes through a hole in the midpoint of the fingers and is threaded into the top of the ejector member. As the ejector is retracted down into the hand, the ends of the resilient spring leaves slide on the inner surface 82 of the cup and at fully retracted position they conform to the shape of the inner cup surface. It will be seen that as the ejector member 120 moves upwardly into the cup to ejecting position, the tips of the leaves, held outwardly by the resiliency of the leaf, slide upwardly along the inner walls of the cup in such a manner that they will scrape the walls clean of any portion of fruit rind which may cling thereto. Since the resilient leaves have a normal flat shape they will continually bow outwardly to maintain their contact with the wall and scrape the entire wall up to the upper edge 130 of the cup in a manner shown in Fig. 5. Small bearing pieces may be secured through the ends of the leaves to provide a bearing bead 131 on the under side of the leaf to slide on the inner cup wall. This bead projects only a very small distance so that the ends of the leaf will still scrape the cup wall.

It is to be noted that the leaves in their normal flattened position have diametral length greater than or at least as great as the width of the cup so as to flatten completely across the mouth of the cup when the plunger is at its full ejecting position. The fingers are also short enough so that the ends of the fingers will be a considerable distance below the upper edge of the cup when the ejector is in the full retracted position. This provision of length insures that the ends of the fingers will scrape the inner surface of the cup when the ejector plunger is moving from retracted to ejecting position.

Any number of scraper leaves may be used, but since they each are positioned to scrape the walls between the slots 94 in the cup which admit the gripping fingers, the same number scrapers should be used as there are gripping fingers. The arrangement of the leaves within the cup is shown in detail in Fig. 6. In the present instance six gripping fingers are used and six scrapers contact the inner cup wall areas. For economy of manufacture two diametrically opposing scraper leaves are formed by one continuous flat leaf which is drilled at the center point. These leaves are positioned at 120° with respect to each other and form the scraper web assembly.

Up to this point the structure of the first and second fruit-carrying hands has been the same. However, because of the difference in their functions, which requires that the first cup receive the fruit from the source of supply and carry it over to the second cup and, because of the problems of obtaining the optimum in securely gripping the fruit, the method of gripping the orange must be different. Therefore, the structure which causes the gripping fingers to operate in each hand is somewhat different. The operating mechanism for the first hand, which is shown on the right in Figs. 1, 2 and 13 through 16 and which is shown in detail in Figs. 5 and 6, will first be described. In order to secure the hand 20 to the arm 22, a collar 132 is slid over the lower cylindrical reduced portion 134 of the hand and held thereon by a threaded ring 136. A bracket 138 is bolted to the collar and attached to the carrying arm in a suitable manner.

At the lower end of the ejector plunger stem 116 is a nut 140 having a rounded head which will strike the projection 70 to eject the orange when the hand is carried to the ejecting position of Fig. 15. Between this nut and the hand is positioned a coil compression spring 142 to urge the ejecting plunger to retracted position. As the rounded nut 140 is carried against the projection 70 the stem 116 is forced upwardly through the hand to force the ejecting plunger 120 upwardly into the semi-cylindrical cup which at ejecting position of the hand carries the extracted fruit rind, thereby forcing the rind out of the cup. The ejecting plunger in its entrance into the cup has cammed the shoulders 112 of gripping fingers outwardly, thereby forcing the fingers away from the rind to release it for expulsion. The movement of the ejecting member to ejecting position also slides the cup scraping leaves 126 upwardly in the cup with the tips of the leaves scraping the side walls of the cups to remove any portions of the rind which may be adhering thereto.

As the hand is pivotally carried upwardly away from the projection 70, the spring 142 begins to return the ejecting plunger to its normal retracted position. This is prevented, however, by a latch pin 144 which snaps into a mating recess 146 in the side of the nut 140. This pin is slidably carried in a hollow boss 148 on the bracket 138. Within the boss a coil compression spring 150 reacts between a plug 152 in the boss opening and a collar 154 secured on the latch pin to urge the pin to latching engagement with the nut 140. This collar 154 also limits the sliding movement of the latch pin so that it will not snap beneath the nut if the nut moves past the latch pin. The latch pin has a beveled engaging face which permits the nut 140 to slide past it as the plunger is moving to ejecting position. The latch engages the nut and stops the plunger as it is moving to retracted position before it can move to fully retracted position, thus holding the ejecting plunger member in engagement with the shoulder 112 of the gripping fingers to hold the grippers in non-gripping position. The plunger is permitted to move partially to retracted position to partially withdraw the ejector leaves into the cup so that a fresh fruit may be placed therein. The fingers are held in non-gripping position by virtue of the action of the latch 144 while the fruit is dropped into the cup.

To release the gripping fingers to have them engage the side of the fruit and force the points 96 into the fruit skin, a latch tripping mechanism is provided. At the end of the latch pin 144 is a tripping follower 156 (shown in Figs. 5 and 6) which, when the hand is moving in its arcuate path from the fruit-receiving position of Fig. 2 to the fruit delivery position of Fig. 13, has an inclined face 160 which engages the follower 156 to release the latch pin and permit the ejector plunger to move to its full retracted position. This moves the ejector plunger 120 away from the shoulders 112 of the gripper fingers permitting them to snap against the side of the fruit and force the sharpened points to bite into the skin of the fruit.

With the fruit thus gripped in the first hand, it is carried to the second hand wherein a different function is performed to cause the fingers to grip the fruit. In this second hand a similar nut 162 is provided at the lower end of the ejector stem 164. The ejector stem is carried within the fruit-carrying hand 128 in a manner similar to the other hand 20. At the top of the stem 164 is a reduced portion 166 over which is placed a hollow ejector plunger or cam which has an upper reduced portion 169 so that when the plunger is fully retracted the shoulders 112 will drop into the space to snap the gripping fingers against the fruit. This ejector plunger 168 of the second hand differs from the ejector plunger 120 of the first hand in that an annular groove or depression 170 (Figs. 10 and 11) is provided into which the shoulders 112 of the gripper fingers may seat (Fig. 11) to temporarily lock the ejector plunger 168 against further movement. In this seated locking position the gripper fingers will remain in the spread non-fruit-engaging position. A coil compression spring 172 is positioned between the nut 162 and the hand to urge the ejector plunger assembly to retracted position.

In operation, when the second hand 28, is swung back to fruit-ejecting position (Fig. 16), the nut 162 strikes the projection 76 to force the ejector plunger to ejecting position where it will engage the shoulders of the gripping fingers causing them to spread. This operation is similar to that of the first hand. As the hand 28 is rotated clockwise to its neutral position in Fig. 14, the plunger begins to move to retracted position by action of the spring 172 but is latched before it can fully return by the gripper finger shoulders 112 dropping into the annular groove 170 in the ejector plunger 168. This locks the ejector plunger against further movement. It will be noticed that the annular groove 170 in the ejector member and the shoulders 112 of the gripping fingers are constructed so that force on the ejector plunger in either direction will cause the shoulders to ride out of the groove, although the action of the annular coil spring 108 is sufficient to lock the plunger against the normal action of the spring 172 which is preferably less strong than the spring 110 on the first hand. With the ejector plunger in the locked position and the gripper fingers spread, the hand 28 is rotated clockwise up to where it meets the hand 20 carrying the gripped fruit.

As is shown in Fig. 12, the fruit 124 is forced against the upper end of the ejector plunger 120 forcing it downwardly into the cup. This will unseat the shoulders 112 of the gripper fingers from their position in the notch 170, permitting the ejector plunger to move downwardly to full retracted position. This releases the gripper fingers and causes the coil spring 108 to snap the fingers against the side of the fruit so that the fruit piercing points 96 will bite into the fruit holding it firmly within the cup.

Thus it will be seen that the fingers of each hand grip the fruit after the fruit is firmly seated within the cup but are each released in a different manner. The plunger of the first cup 20 is locked in engagement with the shoulders of the gripping fingers by means of the latch 144 and is released to move to non-engaging or retracted position after the cup has begun its movement as the latch is released by a stationary cam. In the second cup 28 the plunger is held in gripping finger-engaging position by the fingers themselves and released to move to non-engaging or retracted position by the action of the orange forcing the plunger from its temporary latched position.

It is believed that the action of the mechanism is fully understood from the foregoing description but a brief résumé of the action of the hands will be given to aid in understanding the functions of the fruit-gripping hands. As the hands 20 and 28 are in neutral position, as shown in Fig. 2, the fruit-gripping fingers of the first hand 20 are locked in non-gripping position because the latch 144 in the recess 146 is holding the ejecting plunger in finger-engaging position. After the fruit is dropped into the hand, the hand is carried past the tripping member 158 which releases the latch to cause the ejector plunger 120 to move to retracted non-engaging position, permitting the fingers to snap against the sides of the fruit locking it securely in the cup. The second fruit-carrying hand 28 has its plunger locked in finger-engaging position by virtue of the shoulders 112 of the gripping fingers being seated in the annular groove 170. As the two hands are rotated together the fruit is forced into the cup of the second hand against the ejector member 168, forcing it to non-engaging position and permitting the fruit gripping fingers to snap against the fruit locking it securely in the cup of the second hand. After the fruit is thus securely gripped, the knife severs the fruit and each half section is carried down to the reamer by its carrying hand to have the juice extracted. The first hand 20 swings back to where the nut 140 on the jector plunger strikes the projection 70, forcing the ejector cam member 120 up to engagement with the shoulders 112 to force the spring gripping fingers 92 to part to release the rind. The ejector member 20 lifts the spring leaves 126 upwardly in the cup with the ends of the leaves scraping the interior side walls of the cup. The fruit rind is thus completely expelled and ejected from the cup. As the plunger begins to return to retracted position, just before it can move out of engagement with the gripping fingers, it is locked by the latch finger 144. The second fruit-carrying hand 28 expels the fruit in the same manner and differs only in that the plunger is locked and prevented from moving out of engagement with the gripping fingers by virtue of the shoulders 112 of the fingers dropping in the annular notch 170 of the plunger.

Thus it will be seen that I have provided unique fruit-gripping and carrying hands which will reliably and securely grip sections of fruit and continue gripping them until all fruit juice extracting operations have been performed. The hands may be depended upon to completely expell the rind no matter how tenaciously it sticks to the cup and will be ready to re-perform the cycle of operation.

I have, in the drawings and specification, presented a detailed disclosure of the preferred embodiment of my invention, but it is to be understood that as the invention is susceptible of modifications, structural changes and various applications of use within the spirit and scope of the invention, I do not intend to limit the invention to the specific form disclosed but intend to cover all

I claim as my invention:

1. A fruit handling mechanism for a fruit juicer comprising a fruit carrying hand including fruit gripping fingers capable of gripping a fruit, an ejector plunger operatively associated with the fingers and movable between a fruit gripping position and a fruit ejecting position, the plunger moving the fingers apart when in ejecting position and permitting the fingers to move together when in fruit gripping position, a latching means operatively associated with the plunger to positively lock the plunger in ejecting position, and a spring operatively connected to the ejector plunger to rapidly move it to fruit gripping position when released by the latching means, said latching means being releasable when the fruit is in the hand to permit the ejector to move to fruit gripping position to thereby move the fingers to fruit gripping position.

2. A fruit handling mechanism for a fruit juicer comprising a fruit carrying hand including fruit gripping fingers capable of gripping a fruit, a finger operating member operatively associated with the fingers and movable between a fruit gripping position and a fruit ejecting position, said member moving the gripping fingers apart in fruit releasing position and permitting the fingers to move together when in fruit gripping position, a latch operatively associated with the finger operating member to positively latch said finger operating device in a position with the fingers in fruit release position, means operatively connected to the finger operating member moving it to move the fingers to fruit gripping position when unlatched, and a latch release cam positioned to be engaged by the latch to release it for gripping the fruit.

3. A fruit handling mechanism for a fruit juicer comprising a fruit carrying hand including fruit gripping fingers capable of gripping a fruit, a finger operating plunger operatively associated with the fingers and movable between a fruit gripping position and a fruit release position, the plunger moving the fingers apart when in fruit release position and permitting them to move together when in fruit gripping position, a latch carried on the hand and operatively associated with the finger operating plunger to positively latch said plunger in a position with the fingers in fruit release position, means operatively connected to the finger operating plunger moving it to move the fingers to fruit gripping position when unlatched, means operatively associated with the hand to move it in a path to a plurality of operating positions, and a latch release cam positioned in said path to be engaged by the latch to release it and release the plunger for gripping the fruit.

4. A fruit handling mechanism for a fruit juicer comprising a fruit carrying hand including fruit gripping fingers capable of gripping a fruit, means connected to the fingers urging them to fruit gripping position, an ejector plunger operatively associated with the fingers and movable between a fruit gripping position and a fruit ejecting position, the plunger engaging and moving the fingers apart when in ejecting position and permitting the fingers to move together when in fruit gripping position, a latching means operatively associated with the plunger to positively lock the plunger in ejecting position, said latching means comprising shoulders at the base of the fingers, and a depression on the plunger in which the shoulders are seatable when the plunger is in fruit ejecting position, and spring means operatively associated with the plunger to rapidly move it to fruit gripping position when released by the latch, said latching means being releasable when the fruit is in the hand to permit the ejector to move to fruit gripping position to thereby move the fingers to fruit gripping position.

5. A fruit handling mechanism for a fruit juicer comprising a first fruit carrying hand including fruit gripping fingers capable of carrying a fruit and movable in a path to carry the fruit to a plurality of operating positions, an ejector plunger operatively associated with the fingers and movable between a fruit gripping position and a fruit ejecting position, said plunger moving the gripping fingers apart in fruit releasing position and permitting them to move together in fruit gripping position, a latch carried on the first hand and operatively associated with the plunger to positively lock the plunger in ejecting position, a spring operatively associated with the ejector plunger to rapidly move it to fruit gripping position when released by the lacth, a latch release cam positioned in said path to be engaged by the latch to release it for gripping the fruit, a second fruit carrying hand including fruit carrying fingers capable of gripping a fruit and positionable in the path of the first hand to receive the fruit therefrom, spring means operatively associated with the fingers urging them to fruit gripping position, a second ejector plunger operatively associated with the fingers of said second hand and movable between a fruit gripping position and a fruit ejecting position, said plunger moving the fingers apart when in ejecting position and permitting the fingers to move together when in fruit gripping position, a second latching means operatively associated with said second plunger to positively lock the plunger in ejecting position, a spring operatively connected to said second plunger to rapidly move it to fruit gripping position when released by the latching means, said second latching means being releasable when the fruit is in the hand to permit the ejector to move to fruit gripping position to thereby move the fingers to fruit gripping position.

6. A fruit handling mechanism for a fruit juicer comprising a fruit carrying hand having a curved fruit cavity for holding the fruit, fruit gripping fingers operatively connected to the hand and positioned in said fruit cavity for gripping the fruit, means connected to the fingers urging them to fruit gripping position, an ejector plunger operatively associated with the fingers and movable between a fruit gripping position and a fruit ejecting position, the plunger engaging and moving the fingers apart when in ejecting position and permitting the fingers to move together when in fruit gripping position, resilient spring leaves having a normal unbiased flattened position in a common plane and secured to said ejector plunger, said spring leaves being operatively associated with said fruit cavity to be drawn into the cavity to conform to the curvature of the cavity when the plunger is in fruit gripping position and to spring toward normal flattened position to eject the fruit when the plunger is moved to fruit ejecting position, and a latching means operatively associated with the plunger to positively lock the plunger in ejecting position, said latching means being releasable to move the plunger to fruit gripping position when a fruit is in the hand.

7. A fruit handling mechanism for a fruit juicer comprising a fruit carrying hand having a curved fruit cavity for holding the fruit, fruit gripping fingers operatively connected to the hand and positioned in said fruit cavity for gripping the fruit, means connected to the fingers urging them to fruit gripping position, an ejector plunger operatively associated with the fingers and movable between a fruit gripping position and a fruit ejecting position, the plunger engaging and moving the fingers apart when in ejecting position and permitting the fingers to move together when in fruit gripping position, and resilient spring leaves having a normal unbiased flattened position in a common plane and secured to said ejector plunger, said spring leaves being operatively associated with said fruit cavity to be drawn into the cavity by the plunger to conform to the curvature of the cavity when the plunger is in fruit gripping position and to spring toward normal flattened position to eject the fruit when the plunger is moved to fruit ejecting position.

8. A fruit handling mechanism for a fruit juicer comprising a fruit carrying hand having a curved fruit cavity for holding the fruit, fruit gripping fingers operatively connected to the hand and positioned in said fruit cavity for gripping the fruit, means connected to the fingers urging them to fruit gripping position, an ejector plunger operatively associated with the fingers and movable between a fruit gripping position and a fruit ejecting position, the plunger engaging and moving the fingers apart when in ejecting position and permitting the fingers to move together when in fruit gripping position, and resilient spring leaves having a normal coplanar relationship and secured to said ejector plunger, said spring leaves being operatively associated with said fruit cavity to be drawn into the cavity by the plunger when in fruit gripping position and to spring toward normal coplanar relationship when the plunger is moved to fruit ejecting position, said leaves being of a length so that their ends will rest against the inside wall of the fruit cavity when in fruit gripping position and will scrape the said inside wall when moving to fruit ejecting position.

9. A fruit handling mechanism for a fruit juicer comprising a fruit carrying hand having a curved fruit cavity for holding the fruit, fruit gripping fingers operatively connected to the hand and positioned in said fruit cavity for gripping the fruit, radial passageways in the sides of said hand extending outwardly from said cavity with smooth curved areas between said passageways, the fruit gripping fingers movable through said passageways to grip the fruit, means connected to the fingers urging them to fruit gripping position, an ejector plunger operatively associated with the fingers and movable between a fruit gripping position and a fruit ejecting position, the plunger engaging and moving the fingers apart when in ejecting position and permitting the fingers to move together when in fruit gripping position, and resilient spring leaves having a normal unbiased flattened position in a common plane and secured to said ejector plunger, said spring leaves being operatively associated with said fruit cavity to be drawn into the cavity by the plunger to conform to the curvature of the cavity when the plunger is in fruit gripping position and to spring toward normal flattened position to eject the fruit when the plunger is moved to fruit ejecting position, said leaves positioned between the fruit gripping fingers opposite the smooth curved areas in the cavity.

References Cited in the file of this patent

UNITED STATES PATENTS

| | | |
|---|---|---|
| 1,834,097 | Gum | Dec. 1, 1931 |
| 1,888,528 | Faulds | Nov. 22, 1932 |
| 1,888,529 | Faulds | Nov. 22, 1932 |
| 1,941,347 | Gum | Dec. 26, 1933 |
| 2,274,020 | Weightman et al. | Feb. 24, 1942 |
| 2,365,832 | Monroe | Dec. 26, 1944 |